(12) United States Patent
Katz et al.

(10) Patent No.: US 12,346,306 B2
(45) Date of Patent: Jul. 1, 2025

(54) METHOD AND SYSTEM FOR DATA STREAMING RECONCILIATION

(71) Applicant: JPMorgan Chase Bank, N.A., New York, NY (US)

(72) Inventors: David Katz, Westfield, NJ (US); Maria De La Paz Vives, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 156 days.

(21) Appl. No.: 18/114,480

(22) Filed: Feb. 27, 2023

(65) Prior Publication Data
US 2024/0289320 A1 Aug. 29, 2024

(51) Int. Cl.
*G06F 16/23* (2019.01)
*G06F 16/215* (2019.01)

(52) U.S. Cl.
CPC ........ *G06F 16/2365* (2019.01); *G06F 16/215* (2019.01)

(58) Field of Classification Search
CPC ............... G06F 16/2365; G06F 16/215; G06F 16/24568
See application file for complete search history.

(56) References Cited

U.S. PATENT DOCUMENTS

| | | | | |
|---|---|---|---|---|
| 2014/0230062 | A1* | 8/2014 | Kumaran | H04L 63/1408 726/24 |
| 2019/0370388 | A1* | 12/2019 | Li | G06F 40/295 |
| 2019/0377624 | A1* | 12/2019 | Li | G06F 40/279 |
| 2020/0012980 | A1* | 1/2020 | Li | G06N 5/048 |
| 2020/0026594 | A1* | 1/2020 | Steiner | G06F 21/552 |
| 2021/0096943 | A1* | 4/2021 | Savir | G06Q 30/0635 |
| 2021/0124983 | A1* | 4/2021 | Axenie | G06F 18/24323 |
| 2021/0390455 | A1* | 12/2021 | Schierz | G06N 20/00 |
| 2022/0351132 | A1* | 11/2022 | Tatituri | G06N 20/00 |

* cited by examiner

*Primary Examiner* — Kavita Stanley
*Assistant Examiner* — Cecile H Vo
(74) *Attorney, Agent, or Firm* — GREENBLUM & BERNSTEIN, P.L.C.

(57) ABSTRACT

A method for facilitating reconciliation of streaming data by using an independent reconciliation data stream is disclosed. The method includes receiving events from a data stream; accessing a reconciliation data stream that corresponds to the data stream, the reconciliation data stream including reconciliation events that correspond to the events; determining, by using a model, parameters based on the events and the corresponding reconciliation events, the parameters relating to the data stream; comparing, by using the model, the events with the corresponding reconciliation events to identify data anomalies; validating, by using the model, the events based on the corresponding reconciliation events; and aggregating information that relates to the events, the parameters, the data anomalies, and a result of the validating.

16 Claims, 5 Drawing Sheets

METHOD AND SYSTEM FOR DATA STREAMING RECONCILIATION

BACKGROUND

1. Field of the Disclosure

This technology generally relates to methods and systems for reconciling data, and more particularly to methods and systems for facilitating analysis and reconciliation of streaming data via machine learning and artificial intelligence by using an independent reconciliation data stream.

2. Background Information

Many business entities maintain large quantities of data that, on occasion, must be transmitted between various computing environments such as, for example, from an on-premises computing environment to a cloud computing environment. Often, many technical steps and data transformations may occur during the transmission process. Historically, implementations of conventional reconciliation techniques have resulted in varying degrees of success with respect to ensuring high data quality and completeness of the data stream while also providing data stream monitoring.

One drawback of using the conventional reconciliation techniques is that in many instances, to satisfy regulatory requirements in heavily regulated and complex industries, the large quantities of data must pass through a variety of filters as well as data transformation components prior to publication to a data stream. As a result, monitoring data parameters and ensuring high data quality in the data stream is difficult due to the complexity of the data transmission process. Additionally, the data stream may be enhanced with reference data and aggregated into a variety of views, which further adds to the complexity.

Therefore, there is a need for streaming reconciliation and data quality tooling that leverages machine learning and artificial intelligence to provide near real-time monitoring and validation of data streams by using an independent reconciliation data stream.

SUMMARY

The present disclosure, through one or more of its various aspects, embodiments, and/or specific features or sub-components, provides, inter alia, various systems, servers, devices, methods, media, programs, and platforms for facilitating analysis and reconciliation of streaming data via machine learning and artificial intelligence by using an independent reconciliation data stream.

According to an aspect of the present disclosure, a method for facilitating reconciliation of streaming data by using an independent reconciliation data stream is disclosed. The method is implemented by at least one processor. The method may include receiving at least one event from a data stream; accessing at least one reconciliation data stream that corresponds to the data stream, the at least one reconciliation data stream may include at least one reconciliation event that corresponds to the at least one event; determining, by using at least one model, at least one parameter based on the at least one event and the corresponding at least one reconciliation event, the at least one parameter may relate to the data stream; comparing, by using the at least one model, the at least one event with the corresponding at least one reconciliation event to identify at least one data anomaly; validating, by using the at least one model, the at least one event based on the corresponding at least one reconciliation event; and aggregating information that relates to at least one from among the at least one event, the at least one parameter, the at least one data anomaly, and a result of the validating.

In accordance with an exemplary embodiment, the method may further include identifying, by using the at least one model, at least one reconciliation threshold for each of the at least one parameter; determining, by using the at least one model, whether the at least one parameter exceeds the corresponding at least one reconciliation threshold; and generating at least one alert when the at least one parameter exceeds the corresponding at least one reconciliation threshold, the at least one alert may include information that relates to the at least one reconciliation threshold and the at least one parameter.

In accordance with an exemplary embodiment, the at least one parameter may include at least one from among a data quality value and a data completeness value; and the at least one reconciliation threshold may correspond to a minimum parameter level for ensuring data consistency in the data stream.

In accordance with an exemplary embodiment, the method may further include retrieving, from at least one repository, contextual data that corresponds to the at least one parameter, the at least one repository may include a data lake; determining, by using the at least one model and the contextual data, at least one potential impact to the data stream as a result of exceeding the at least one reconciliation threshold, the at least one potential impact may include a severity level; and appending, based on the severity level, the at least one alert to include data that relates to the at least one potential impact.

In accordance with an exemplary embodiment, the method may further include determining, by using the at least one model, at least one potential data error in the data stream based on the identified at least one data anomaly; and generating at least one alert for at least one user, the at least one alert may include information that relates to the at least one data anomaly and the at least one potential data error.

In accordance with an exemplary embodiment, the method may further include retrieving, from at least one repository, contextual data that corresponds to the at least one potential data error, the at least one repository may include a data lake; determining, by using the at least one model and the contextual data, at least one potential impact to the data stream as a result of the at least one potential data error, the at least one potential impact may include a severity level; and appending, based on the severity level, the at least one alert to include data that relates to the at least one potential impact.

In accordance with an exemplary embodiment, the at least one event may be released to at least one downstream consumer based on at least one from among a first result of the determining, a second result of the comparing, and a third result of the validating.

In accordance with an exemplary embodiment, the at least one reconciliation data stream may be generated via at least one upstream producer together with the data stream, the at least one reconciliation data stream may include an expected output of the data stream.

In accordance with an exemplary embodiment, the at least one model includes at least one from among a machine learning model, a mathematical model, a process model, and a data model.

According to an aspect of the present disclosure, a computing device configured to implement an execution of a method for facilitating reconciliation of streaming data by using an independent reconciliation data stream is disclosed. The computing device including a processor; a memory; and a communication interface coupled to each of the processor and the memory, wherein the processor may be configured to receive at least one event from a data stream; access at least one reconciliation data stream that corresponds to the data stream, the at least one reconciliation data stream may include at least one reconciliation event that corresponds to the at least one event; determine, by using at least one model, at least one parameter based on the at least one event and the corresponding at least one reconciliation event, the at least one parameter may relate to the data stream; compare, by using the at least one model, the at least one event with the corresponding at least one reconciliation event to identify at least one data anomaly; validate, by using the at least one model, the at least one event based on the corresponding at least one reconciliation event; and aggregate information that relates to at least one from among the at least one event, the at least one parameter, the at least one data anomaly, and a result of the validating.

In accordance with an exemplary embodiment, the processor may be further configured to identify, by using the at least one model, at least one reconciliation threshold for each of the at least one parameter; determine, by using the at least one model, whether the at least one parameter exceeds the corresponding at least one reconciliation threshold; and generate at least one alert when the at least one parameter exceeds the corresponding at least one reconciliation threshold, the at least one alert may include information that relates to the at least one reconciliation threshold and the at least one parameter.

In accordance with an exemplary embodiment, the at least one parameter may include at least one from among a data quality value and a data completeness value; and the at least one reconciliation threshold may correspond to a minimum parameter level for ensuring data consistency in the data stream.

In accordance with an exemplary embodiment, the processor may be further configured to retrieve, from at least one repository, contextual data that corresponds to the at least one parameter, the at least one repository may include a data lake; determine, by using the at least one model and the contextual data, at least one potential impact to the data stream as a result of exceeding the at least one reconciliation threshold, the at least one potential impact may include a severity level; and append, based on the severity level, the at least one alert to include data that relates to the at least one potential impact.

In accordance with an exemplary embodiment, the processor may be further configured to determine, by using the at least one model, at least one potential data error in the data stream based on the identified at least one data anomaly; and generate at least one alert for at least one user, the at least one alert may include information that relates to the at least one data anomaly and the at least one potential data error.

In accordance with an exemplary embodiment, the processor may be further configured to retrieve, from at least one repository, contextual data that corresponds to the at least one potential data error, the at least one repository may include a data lake; determine, by using the at least one model and the contextual data, at least one potential impact to the data stream as a result of the at least one potential data error, the at least one potential impact may include a severity level; and append, based on the severity level, the at least one alert to include data that relates to the at least one potential impact.

In accordance with an exemplary embodiment, the processor may be further configured to release the at least one event to at least one downstream consumer based on at least one from among a first result of the determining, a second result of the comparing, and a third result of the validating.

In accordance with an exemplary embodiment, the processor may be further configured to generate, via at least one upstream producer, the at least one reconciliation data stream together with the data stream, the at least one reconciliation data stream may include an expected output of the data stream.

In accordance with an exemplary embodiment, the at least one model may include at least one from among a machine learning model, a mathematical model, a process model, and a data model.

According to an aspect of the present disclosure, a non-transitory computer readable storage medium storing instructions for facilitating reconciliation of streaming data by using an independent reconciliation data stream is disclosed. The storage medium including executable code which, when executed by a processor, may cause the processor to receive at least one event from a data stream; access at least one reconciliation data stream that corresponds to the data stream, the at least one reconciliation data stream may include at least one reconciliation event that corresponds to the at least one event; determine, by using at least one model, at least one parameter based on the at least one event and the corresponding at least one reconciliation event, the at least one parameter may relate to the data stream; compare, by using the at least one model, the at least one event with the corresponding at least one reconciliation event to identify at least one data anomaly; validate, by using the at least one model, the at least one event based on the corresponding at least one reconciliation event; and aggregate information that relates to at least one from among the at least one event, the at least one parameter, the at least one data anomaly, and a result of the validating.

In accordance with an exemplary embodiment, when executed by the processor, the executable code may further cause the processor to release the at least one event to at least one downstream consumer based on at least one from among a first result of the determining, a second result of the comparing, and a third result of the validating.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
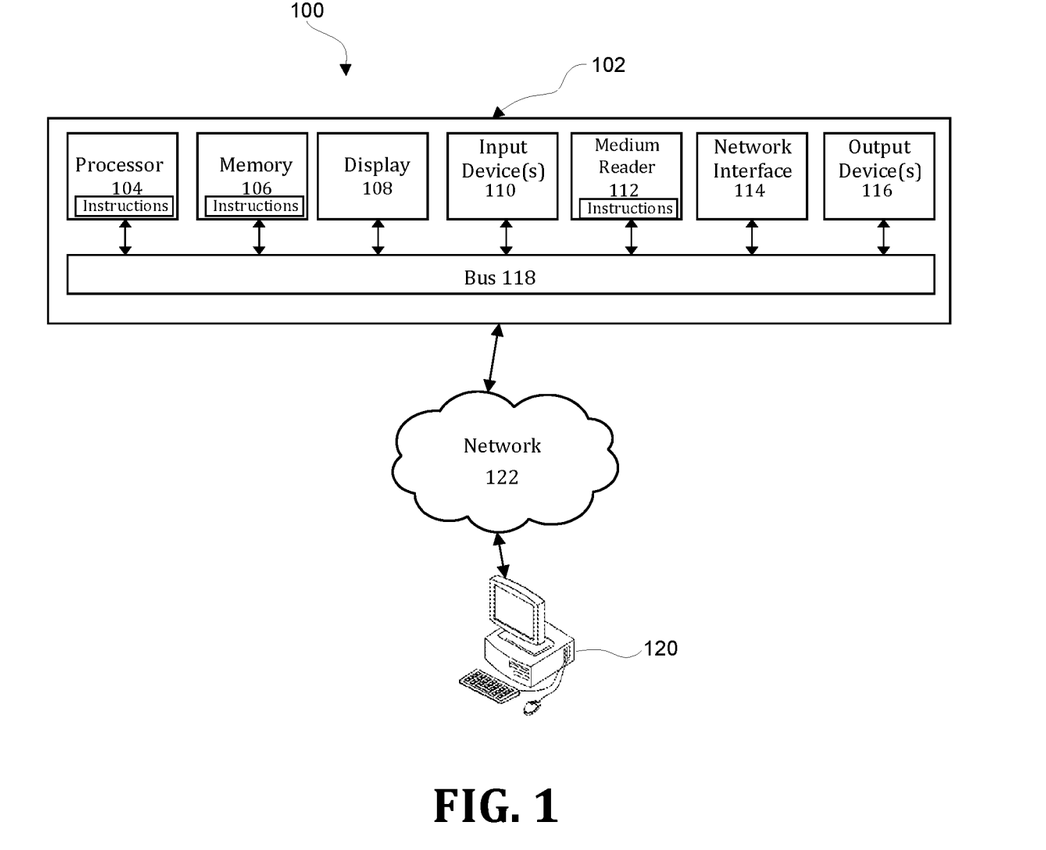
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or subsystems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating analysis and reconciliation of streaming data via machine learning and artificial intelligence by using an independent reconciliation data stream.

Figure 2:
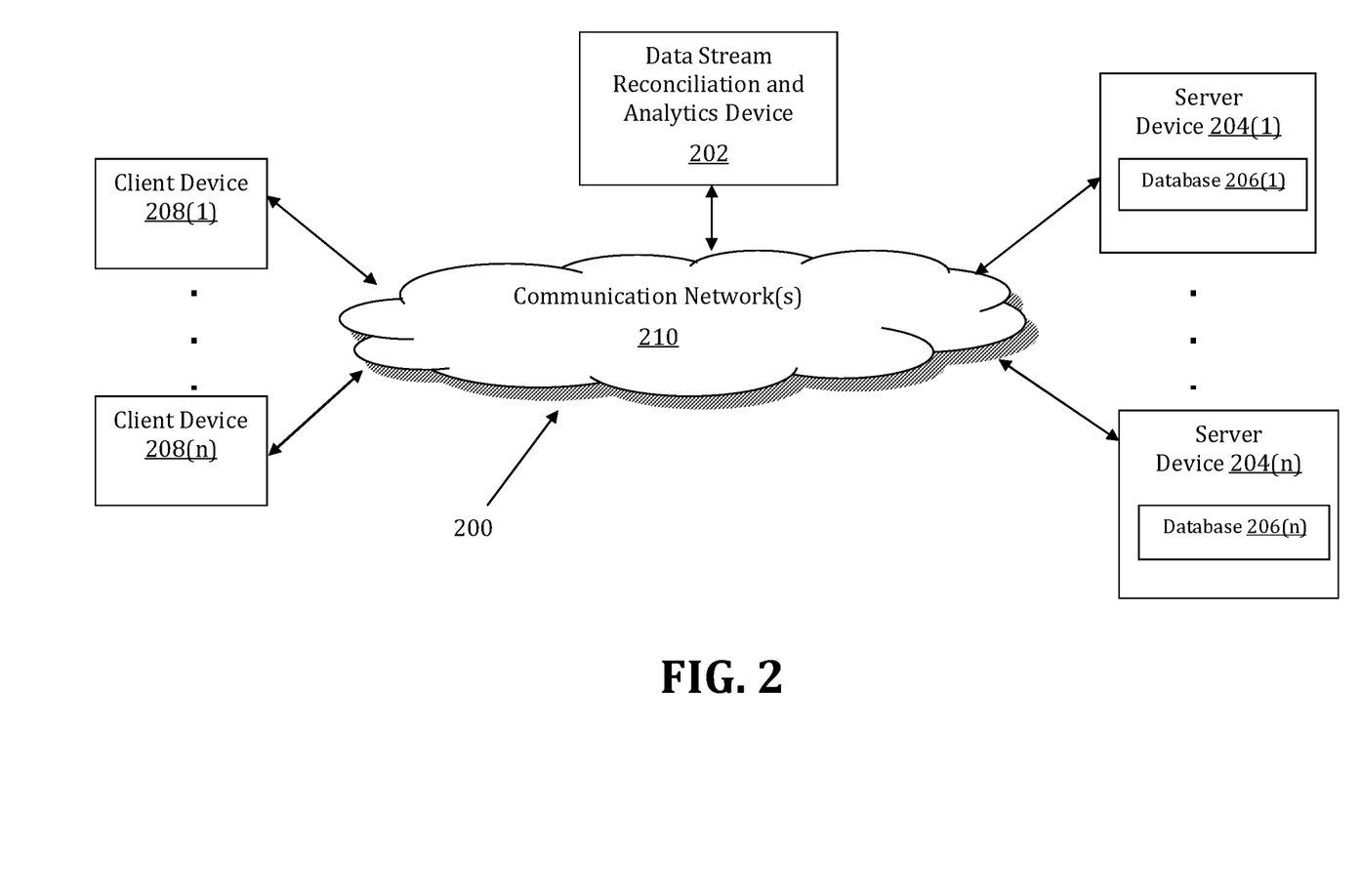
FIG. 2 illustrates an exemplary diagram of a network environment.

Referring to FIG. 2, a schematic of an exemplary network environment 200 for implementing a method for facilitating analysis and reconciliation of streaming data via machine learning and artificial intelligence by using an independent reconciliation data stream is illustrated. In an exemplary embodiment, the method is executable on any networked computer platform, such as, for example, a personal computer (PC).

The method for facilitating analysis and reconciliation of streaming data via machine learning and artificial intelligence by using an independent reconciliation data stream may be implemented by a Data Stream Reconciliation and Analytics (DSRA) device 202. The DSRA device 202 may be the same or similar to the computer system 102 as described with respect to FIG. 1. The DSRA device 202 may store one or more applications that can include executable instructions that, when executed by the DSRA device 202, cause the DSRA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DSRA device 202 itself, may be located in virtual server(s) running in a cloud-based computing environment rather than being tied to one or more specific physical network computing devices. Also, the application(s) may be running in one or more virtual machines (VMs) executing on the DSRA device 202. Additionally, in one or more embodiments of this technology, virtual machine(s) running on the DSRA device 202 may be managed or supervised by a hypervisor.

In the network environment 200 of FIG. 2, the DSRA device 202 is coupled to a plurality of server devices 204(1)-204(n) that hosts a plurality of databases 206(1)-206

(*n*), and also to a plurality of client devices **208(1)-208(*n*) via communication network(s) 210. A communication interface of the DSRA device 202, such as the network interface 114 of the computer system 102 of FIG. 1, operatively couples and communicates between the DSRA device 202, the server devices 204(1)-204(*n*), and/or the client devices 208(1)-208(*n*), which are all coupled together by the communication network(s) 210**, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DSRA device 202, the server devices **204(1)-204(*n*), and/or the client devices 208(1)-208(*n*) may be coupled together via other topologies. Additionally, the network environment 200** may include other network devices such as one or more routers and/or switches, for example, which are well known in the art and thus will not be described herein. This technology provides a number of advantages including methods, non-transitory computer readable media, and DSRA devices that efficiently implement a method for facilitating analysis and reconciliation of streaming data via machine learning and artificial intelligence by using an independent reconciliation data stream.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DSRA device 202 may be a standalone device or integrated with one or more other devices or apparatuses, such as one or more of the server devices **204(1)-204(*n*), for example. In one particular example, the DSRA device 202 may include or be hosted by one of the server devices 204(1)-204(*n*), and other arrangements are also possible. Moreover, one or more of the devices of the DSRA device 202** may be in a same or a different communication network including one or more public, private, or cloud networks, for example.

The plurality of server devices **204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204(*n*) in this example may process requests received from the DSRA device 202 via the communication network(s) 210** according to the HTTP-based and/or JavaScript Object Notation (JSON) protocol, for example, although other protocols may also be used.

The server devices **204(1)-204(*n*) may be hardware or software or may represent a system with multiple servers in a pool, which may include internal or external networks. The server devices 204(1)-204(*n*) hosts the databases 206(1)-206(*n*)** that are configured to store data that relates to data streams, reconciliation data streams, events, reconciliation events, machine learning models, parameters, data anomalies, reconciliation thresholds, potential data errors, data quality values, and data completeness values.

Although the server devices **204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a controller/agent approach, whereby one of the network computing devices of the server devices 204(1)-204(*n*)** operates to manage and/or otherwise coordinate operations of the other network computing devices.

The server devices **204(1)-204(*n*)** may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices **208(1)-208(*n*) may also be the same or similar to the computer system 102 or the computer device 120 as described with respect to FIG. 1, including any features or combination of features described with respect thereto. For example, the client devices 208(1)-208(*n*) in this example may include any type of computing device that can interact with the DSRA device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208** is a wireless mobile communication device, i.e., a smart phone.

The client devices **208(1)-208(*n*) may run interface applications, such as standard web browsers or standalone client applications, which may provide an interface to communicate with the DSRA device 202 via the communication network(s) 210 in order to communicate user requests and information. The client devices 208(1)-208(*n*)** may further include, among other features, a display device, such as a display screen or touchscreen, and/or an input device, such as a keyboard, for example.

Although the exemplary network environment 200 with the DSRA device 202, the server devices **204(1)-204(*n*), the client devices 208(1)-208(*n*), and the communication network(s) 210** are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DSRA device 202, the server devices **204(1)-204(*n*), or the client devices 208(1)-208(*n*), for example, may be configured to operate as virtual instances on the same physical machine. In other words, one or more of the DSRA device 202, the server devices 204(1)-204(*n*), or the client devices 208(1)-208(*n*) may operate on the same physical device rather than as separate devices communicating through communication network(s) 210. Additionally, there may be more or fewer DSRA devices 202, server devices 204(1)-204(n), or client devices 208(1)-208(n) than illustrated in FIG. 2**.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
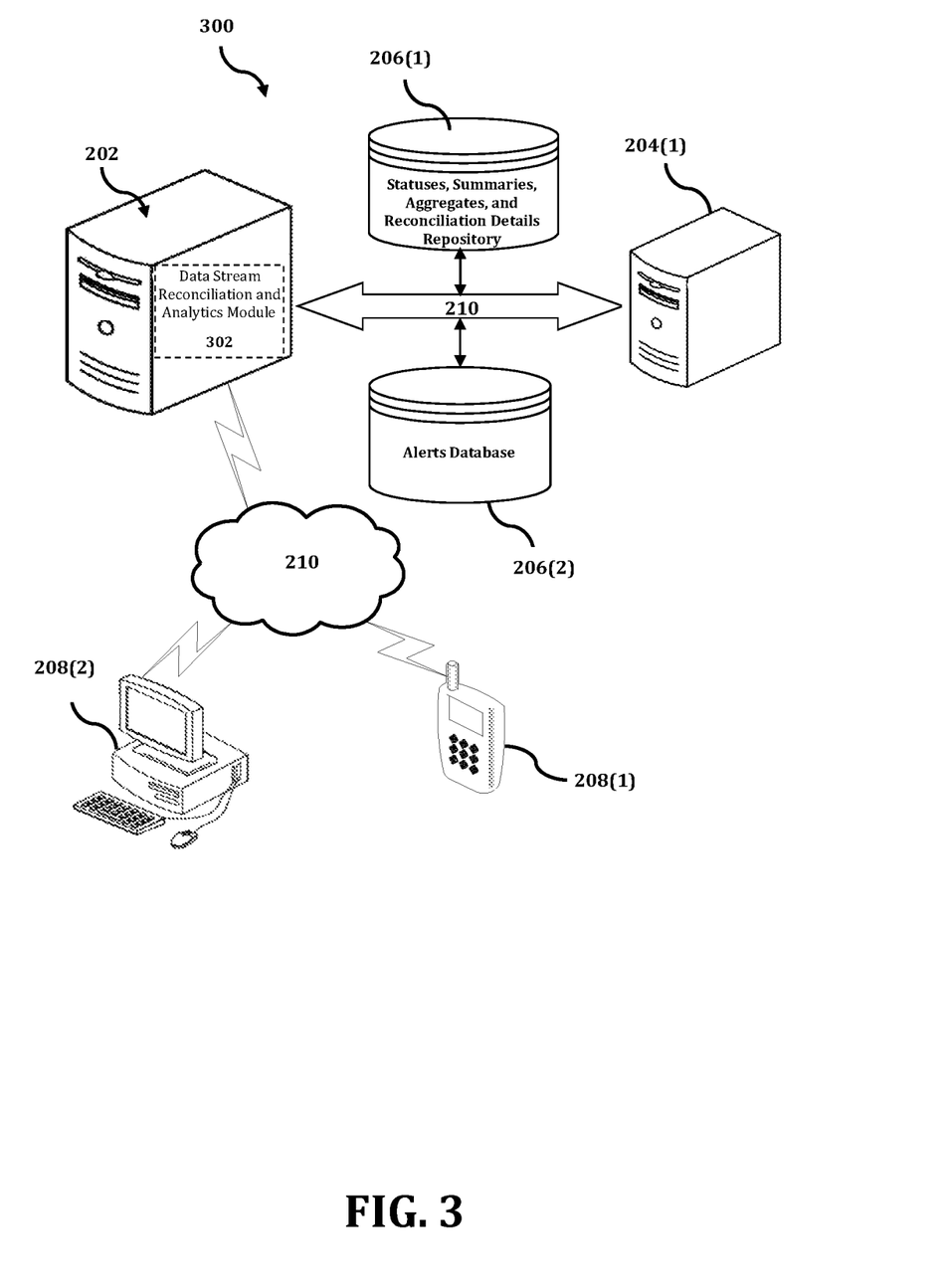
FIG. 3 shows an exemplary system for implementing a method for facilitating analysis and reconciliation of streaming data via machine learning and artificial intelligence by using an independent reconciliation data stream.

The DSRA device 202 is described and shown in FIG. 3 as including a data stream reconciliation and analytics module 302, although it may include other rules, policies, modules, databases, or applications, for example. As will be described below, the data stream reconciliation and analytics module 302 is configured to implement a method for facilitating analysis and reconciliation of streaming data via machine learning and artificial intelligence by using an independent reconciliation data stream.

An exemplary process 300 for implementing a mechanism for facilitating analysis and reconciliation of streaming data via machine learning and artificial intelligence by using an independent reconciliation data stream by utilizing the network environment of FIG. 2 is shown as being executed in FIG. 3. Specifically, a first client device 208(1) and a second client device 208(2) are illustrated as being in communication with DSRA device 202. In this regard, the first client device 208(1) and the second client device 208(2) may be "clients" of the DSRA device 202 and are described herein as such. Nevertheless, it is to be known and understood that the first client device 208(1) and/or the second client device 208(2) need not necessarily be "clients" of the DSRA device 202, or any entity described in association therewith herein. Any additional or alternative relationship may exist between either or both of the first client device 208(1) and the second client device 208(2) and the DSRA device 202, or no relationship may exist.

Further, DSRA device 202 is illustrated as being able to access a statuses, summaries, aggregates, and reconciliation details repository 206(1) and an alerts database 206(2). The data stream reconciliation and analytics module 302 may be configured to access these databases for implementing a method for facilitating analysis and reconciliation of streaming data via machine learning and artificial intelligence by using an independent reconciliation data stream.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DSRA device 202 via broadband or cellular communication. Of course, these embodiments are merely exemplary and are not limiting or exhaustive.

Upon being started, the data stream reconciliation and analytics module 302 executes a process for facilitating analysis and reconciliation of streaming data via machine learning and artificial intelligence by using an independent reconciliation data stream. An exemplary process for facilitating analysis and reconciliation of streaming data via machine learning and artificial intelligence by using an independent reconciliation data stream is generally indicated at flowchart 400 in FIG. 4.

Figure 4:
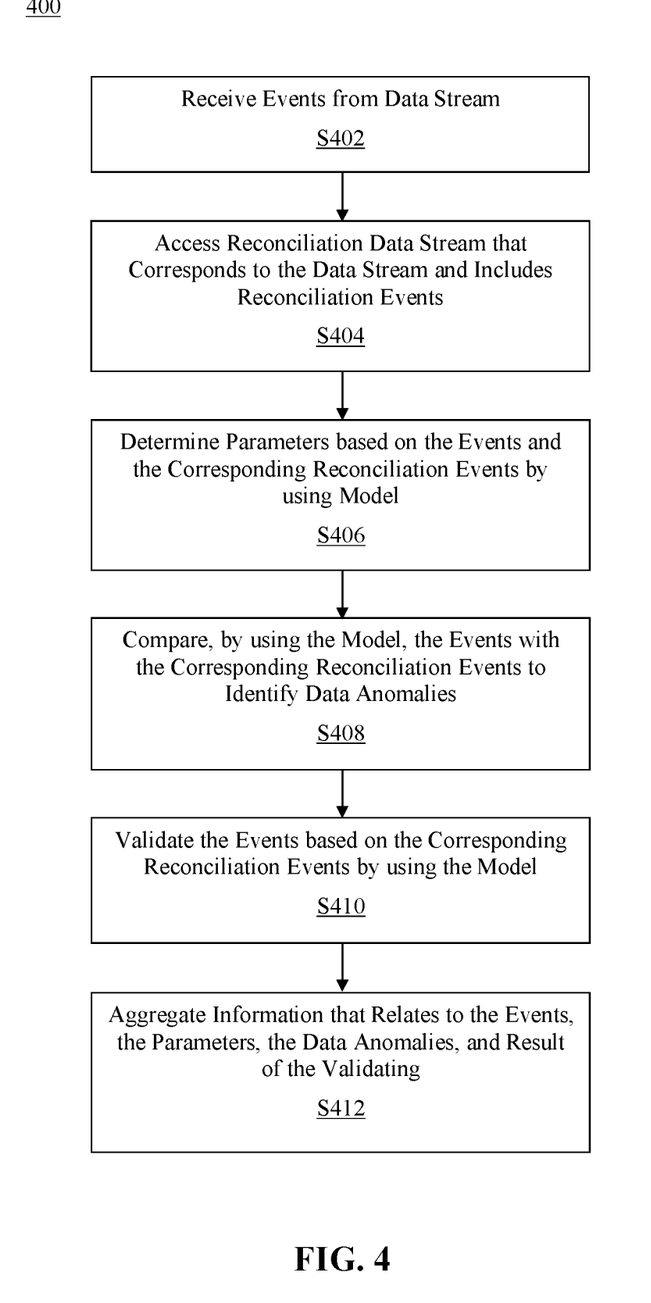
FIG. 4 is a flowchart of an exemplary process for implementing a method for facilitating analysis and reconciliation of streaming data via machine learning and artificial intelligence by using an independent reconciliation data stream.

In the process 400 of FIG. 4, at step S402, events may be received from a data stream. In an exemplary embodiment, the events may correspond to an action or an occurrence that is recognizable by a software program. The events may be generated and/or triggered by a computing component such as, for example, an application and dictates the control flow of the software program. In another exemplary embodiment, the events may include information that relates to the triggering action. The event may include various components such as, for example, metadata that describes the triggering action. For example, when data is migrated from one operating environment to another, the event may include a portion of the data to be migrated as well as a description of the data.

In another exemplary embodiment, the data stream may correspond to a process of transmitting a continuous flow of data. The data stream may include a series of data elements such as, for example, the events that are ordered in time. In another exemplary embodiment, the data stream may facilitate the transmission of data between a data producer and a downstream data consumer. The downstream data consumer may subscribe to the upstream data producer to receive desired data from the data stream. For example, an application in a cloud computing environment may subscribe to another application in an on-premises computing environment to facilitate data transfer between the different platforms. Event data may be transferred from the on-premises computing environment to the cloud computing environment via the data stream.

In another exemplary embodiment, the application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, a reconciliation data stream that corresponds to the data stream may be accessed. In an exemplary embodiment, the reconciliation data stream may correspond to an independent stream of data that corresponds to the initial data stream. The reconciliation data stream may be generated via an upstream data producer together with the data stream. In another exemplary embodiment, the reconciliation data stream may transmit corresponding data that reflects the original data in the data stream. The reconciliation data stream may include an expected output of the data stream.

In another exemplary embodiment, the reconciliation data stream may include reconciliation events that correspond to the received events. The reconciliation events may relate to the received events and represent an idealized representation of the received events. In another exemplary embodiment, the reconciliation events may be computed based on anticipated transitions and transformations of the received events. The reconciliation events may be filtered and transformed similar to the received events to reflect a resulting event.

At step S406, parameters may be determined based on the events and the corresponding reconciliation events. The parameters may relate to the data stream. In an exemplary embodiment, the parameters may include at least one from among a data quality value and a data completeness value. The data quality value may represent a measure of a condition of the received data based on factors such as, for example, accuracy, consistency, and reliability. The quality of the received data may reflect how well suited the received data is to serve its intended purpose. The data completeness value may represent a measure of how complete the resulting data is when compared to the original data. The data completeness value may also depend on whether a set of resulting data is up to date.

In another exemplary embodiment, the parameters may also include a status value and a percentage matched value. The status value may represent a current condition of the data stream and the received event. For example, the status of a received event may indicate whether the received event is currently held in state and whether or not the received event has been matched. The percentage matched value may represent a proportion of events that have been received versus what is expected. In another exemplary embodiment, to determine the parameters, a percentage of the population of expected data may be compared to the available data in a downstream computing environment. The parameters may be determined in near real-time as well as in real-time by using a model.

In another exemplary embodiment, the model may include at least one from among a machine learning model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, reconciliation thresholds may be identified for each of the parameters. The reconciliation thresholds may be identified in near real-time as well as in real-time by using the model. The reconciliation thresholds may correspond to minimum parameter levels for ensuring data consistency in the data stream. For example, the reconciliation thresholds may relate to a minimum data quality level below which the output quality from the data stream may be materially affected. In another exemplary embodiment, because the reconciliation thresholds are identified for each of the parameters, the reconciliation threshold may be usable to identify specific parameters that may require additional attention. For example, the reconciliation threshold may be used to identify a specific area of the data stream that is dropping in quality.

Then, whether any of the parameters exceed the corresponding reconciliation thresholds may be determined. Consistent with present disclosures, the determination may be accomplished in near real-time as well as in real-time by using the model. Alerts may be generated when the parameters exceed the corresponding reconciliation thresholds. The alerts may include information that relates to the reconciliation threshold and the corresponding parameters. The alerts may be transmitted to a responsible user such as, for example, an administrator.

In another exemplary embodiment, contextual data that corresponds to the parameters such as, for example, business contextual data may be retrieved. The contextual data may be retrieved from a repository such as, for example, a connected data lake. Potential impacts to the data stream as a result of exceeding the reconciliation thresholds may then be determined by using the model and the contextual data. The potential impact may include a severity level such as, for example, a minor level of impact and a severe level of impact. The severity level may be dynamically determined by using the model and the contextual data. The alert may be appended based on the severity level to include data that relates to the potential impact. For example, a minor level of impact may not necessitate an alert while a severe level of impact may require additional emphasis.

At step S408, the events may be compared with the corresponding reconciliation events to identify data anomalies. The events may be compared in near real-time as well as in real-time by using the model. In an exemplary embodiment, the data anomalies may correspond to an inconsistency of the data in the data stream. The inconsistency may reflect a difference between the events and the expected outcome of the reconciliation events. The inconsistency may relate to a particular data set as well as reveal a pattern of irregularities with a data stream process such as, for example, a data formatting process. For example, a comparison of the events and the reconciliation events may indicate a pattern of irregularity in transformed data sets.

In another exemplary embodiment, potential data errors in the data stream may be determined based on the identified data anomaly. The potential data errors may be identified by using the model in near real-time as well as in real-time. The potential data errors may relate to an error that is likely to occur based on the identified data anomaly. Then, alerts may be generated for a responsible user such as, for example, an administrator. The alerts may include information that relates to the data anomaly and the potential data error.

In another exemplary embodiment, consistent with present disclosures, contextual data such as, for example, business context data that corresponds to the potential data error may be retrieved. The contextual data may be retrieved from a repository such as, for example, a connected data lake. Potential impacts to the data stream as a result of the potential data errors may then be determined by using the model and the contextual data. The potential impact may include a severity level such as, for example, a minor level of impact and a severe level of impact. The severity level may be dynamically determined by using the model and the contextual data. The alert may be appended based on the severity level to include data that relates to the potential impact. For example, a minor level of impact may not necessitate an alert while a severe level of impact may require additional emphasis.

At step S410, the events may be validated based on the corresponding reconciliation events. The events may be validated in near real-time as well as in real-time by using the model. In an exemplary embodiment, the events may be validated based on a matching of the events with the reconciliation events. The events may be validated when data in the event matches the expected outcome for the event from the reconciliation events. In another exemplary embodiment, the events may be validated based on the parameters and any identified data anomalies. For example, the events may be validated when determined parameters are above the reconciliation threshold. Similarly, the events may be validated when there are no identified data anomalies.

In another exemplary embodiment, the events may be kept in state pending an outcome of the matching process. The events may be released to downstream consumers based on at least one from among a first result of the determining, a second result of the comparing, and a third result of the validating. In another exemplary embodiment, the events may be kept in state for a predetermined period of time such as, for example, ten minutes. The events may be released to downstream consumers when the predetermined period of time has elapsed.

At step S412, information that relates to at least one from among the events, the parameters, the data anomalies, and a result of the validating may be aggregated. In an exemplary embodiment, the information may be persisted in a repository to facilitate documentation for the data stream. The information may be persisted based on a predetermined criterion such as, for example, a persisted time. In another exemplary embodiment, the information may be formatted for presentation to a user. The information may be displayed via a graphical user interface such as, for example, a dashboard by using graphical elements. The graphical elements may visually represent the information and enable interactions with the user. For example, the graphical elements may be configured to receive input from the user to further filter and organize the information.

Figure 5:
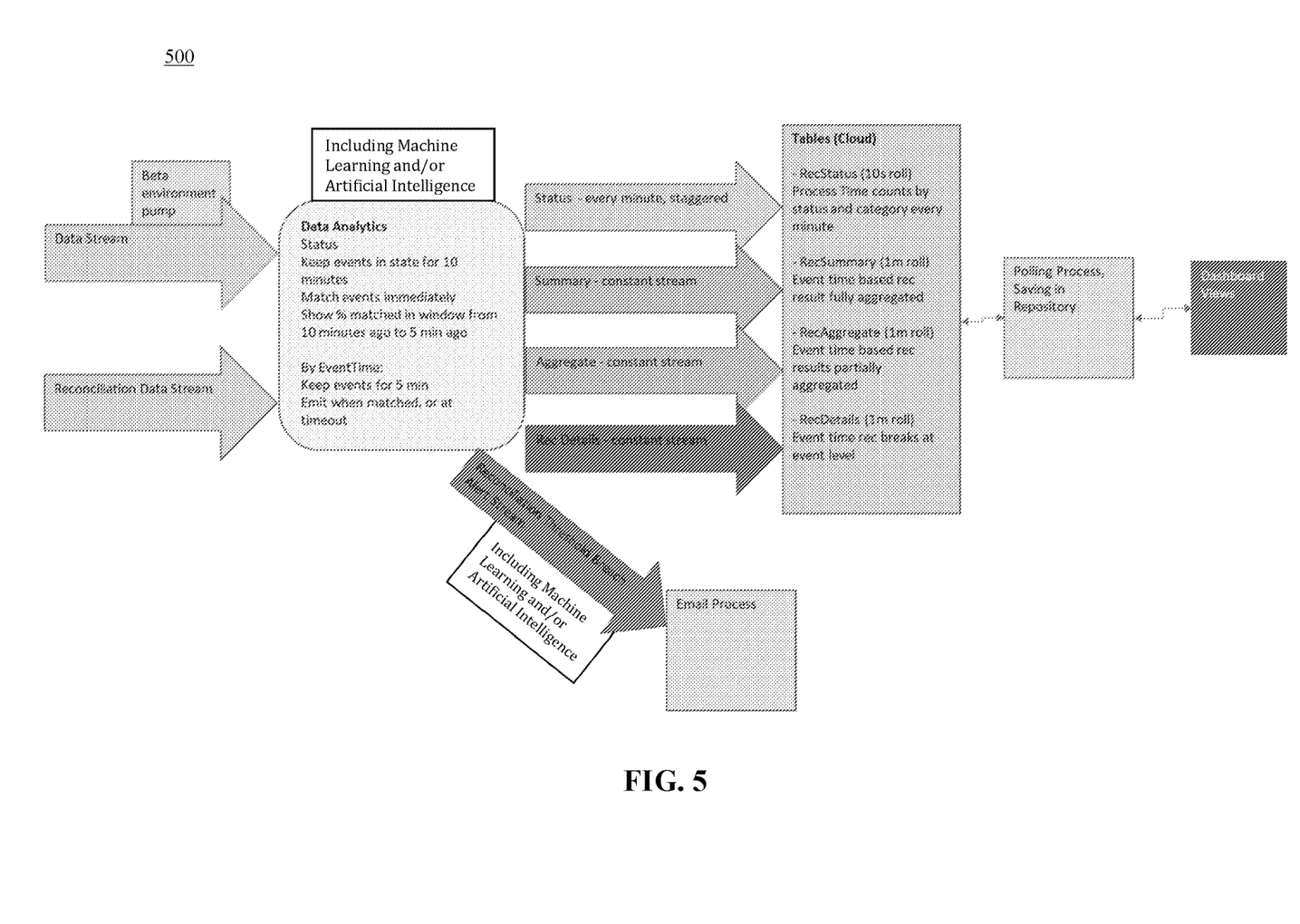
FIG. 5 is a flow diagram of an exemplary process for implementing a method for facilitating analysis and reconciliation of streaming data via machine learning and artificial intelligence by using an independent reconciliation data stream.

FIG. 5 is a flow diagram 500 of an exemplary process for implementing a method for facilitating analysis and reconciliation of streaming data via machine learning and artificial intelligence by using an independent reconciliation data stream. In FIG. 5, the data stream is usable to send data from an on-premises computing environment into a cloud computing environment.

As illustrated in FIG. 5, the data stream and the reconciliation data stream may be received by a data analytics component that performs various actions consistent with present disclosures. For example, the data analytics component may determine a status of the data stream and keep events in state for ten minutes. When abnormalities are detected in the data stream by the data analytics component, an alert stream may be initiated. The alert stream may facilitate generation of an alert that is transmitted to a user via a communication interface such as, for example, an email interface. The abnormalities may include a reconciliation threshold breach.

When the data stream is validated, the data analytics component may output the event to a downstream data consumer such as, for example, an application in the cloud computing environment. Additionally, the data analytics component may output aggregated analytics data to downstream computing components for persistence as well as for presentation to the user. The aggregated analytics data may be transformed for display via a graphical user interface such as, for example, a dashboard.

Accordingly, with this technology, an optimized process for facilitating analysis and reconciliation of streaming data via machine learning and artificial intelligence by using an independent reconciliation data stream is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating reconciliation of streaming data by using an independent reconciliation data stream, the method being implemented by at least one processor, the method comprising:

receiving, by the at least one processor, at least one event from a data stream;

accessing, by the at least one processor, at least one reconciliation data stream that corresponds to the data stream, the at least one reconciliation data stream including at least one reconciliation event that corresponds to the at least one event;

determining, by the at least one processor using at least one model, at least one parameter based on the at least one event and the corresponding at least one reconciliation event, the at least one parameter relating to the data stream;

comparing, by the at least one processor using the at least one model, the at least one event with the corresponding at least one reconciliation event to identify at least one data anomaly;

validating, by the at least one processor using the at least one model, the at least one event based on the corresponding at least one reconciliation event;

aggregating, by the at least one processor, information that relates to at least one from among the at least one event, the at least one parameter, the at least one data anomaly, and a result of the validating;

determining, by the at least one processor using the at least one model, at least one potential data error in the data stream based on the identified at least one data anomaly;

generating, by the at least one processor, at least one alert for at least one user, the at least one alert including information that relates to the at least one data anomaly and the at least one potential data error;

retrieving, by the at least one processor from at least one repository, contextual data that corresponds to the at least one potential data error, the at least one repository including a data lake;

determining, by the at least one processor using the at least one model and the contextual data, at least one potential impact to the data stream as a result of the at least one potential data error, the at least one potential impact including a severity level; and appending, by the at least one processor based on the severity level, the at least one alert to include data that relates to the at least one potential impact.

2. The method of claim 1, further comprising:

identifying, by the at least one processor using the at least one model, at least one reconciliation threshold for each of the at least one parameter;

determining, by the at least one processor using the at least one model, whether the at least one parameter exceeds the corresponding at least one reconciliation threshold; and generating, by the at least one processor, at least one alert when the at least one parameter exceeds the corresponding at least one reconciliation threshold, the at least one alert including information that relates to the at least one reconciliation threshold and the at least one parameter.

3. The method of claim 2, wherein the at least one parameter includes at least one from among a data quality value and a data completeness value; and wherein the at least one reconciliation threshold corresponds to a minimum parameter level for ensuring data consistency in the data stream.

4. The method of claim 2, further comprising:

retrieving, by the at least one processor from at least one repository, contextual data that corresponds to the at least one parameter, the at least one repository including a data lake;

determining, by the at least one processor using the at least one model and the contextual data, at least one potential impact to the data stream as a result of exceeding the at least one reconciliation threshold, the at least one potential impact including a severity level; and appending, by the at least one processor based on the severity level, the at least one alert to include data that relates to the at least one potential impact.

5. The method of claim 1, wherein the at least one event is released to at least one downstream consumer based on at least one from among a first result of the determining, a second result of the comparing, and a third result of the validating.

6. The method of claim 1, wherein the at least one reconciliation data stream is generated via at least one upstream producer together with the data stream, the at least one reconciliation data stream including an expected output of the data stream.

7. The method of claim 1, wherein the at least one model includes at least one from among a machine learning model, a mathematical model, a process model, and a data model.

8. A computing device configured to implement an execution of a method for facilitating reconciliation of streaming data by using an independent reconciliation data stream, the computing device comprising:

a processor;
a memory; and
a communication interface coupled to each of the processor and the memory,
wherein the processor is configured to:
  receive at least one event from a data stream;
  access at least one reconciliation data stream that corresponds to the data stream, the at least one reconciliation data stream including at least one reconciliation event that corresponds to the at least one event;
  determine, by using at least one model, at least one parameter based on the at least one event and the corresponding at least one reconciliation event, the at least one parameter relating to the data stream;
  compare, by using the at least one model, the at least one event with the corresponding at least one reconciliation event to identify at least one data anomaly;
  validate, by using the at least one model, the at least one event based on the corresponding at least one reconciliation event;
  aggregate information that relates to at least one from among the at least one event, the at least one parameter, the at least one data anomaly, and a result of the validating;
  determine, by using the at least one model, at least one potential data error in the data stream based on the identified at least one data anomaly;
  generate at least one alert for at least one user, the at least one alert including information that relates to the at least one data anomaly and the at least one potential data error;
  retrieve, from at least one repository, contextual data that corresponds to the at least one potential data error, the at least one repository including a data lake;
  determine, by using the at least one model and the contextual data, at least one potential impact to the data stream as a result of the at least one potential data error, the at least one potential impact including a severity level; and
  append, based on the severity level, the at least one alert to include data that relates to the at least one potential impact.

9. The computing device of claim 8, wherein the processor is further configured to:
  identify, by using the at least one model, at least one reconciliation threshold for each of the at least one parameter;
  determine, by using the at least one model, whether the at least one parameter exceeds the corresponding at least one reconciliation threshold; and
  generate at least one alert when the at least one parameter exceeds the corresponding at least one reconciliation threshold, the at least one alert including information that relates to the at least one reconciliation threshold and the at least one parameter.

10. The computing device of claim 9, wherein the at least one parameter includes at least one from among a data quality value and a data completeness value; and wherein the at least one reconciliation threshold corresponds to a minimum parameter level for ensuring data consistency in the data stream.

11. The computing device of claim 9, wherein the processor is further configured to:
retrieve, from at least one repository, contextual data that corresponds to the at least one parameter, the at least one repository including a data lake;
determine, by using the at least one model and the contextual data, at least one potential impact to the data stream as a result of exceeding the at least one reconciliation threshold, the at least one potential impact including a severity level; and
append, based on the severity level, the at least one alert to include data that relates to the at least one potential impact.

12. The computing device of claim 8, wherein the processor is further configured to release the at least one event to at least one downstream consumer based on at least one from among a first result of the determining, a second result of the comparing, and a third result of the validating.

13. The computing device of claim 8, wherein the processor is further configured to generate, via at least one upstream producer, the at least one reconciliation data stream together with the data stream, the at least one reconciliation data stream including an expected output of the data stream.

14. The computing device of claim 8, wherein the at least one model includes at least one from among a machine learning model, a mathematical model, a process model, and a data model.

15. A non-transitory computer readable storage medium storing instructions for facilitating reconciliation of streaming data by using an independent reconciliation data stream, the storage medium comprising executable code which, when executed by a processor, causes the processor to:
receive at least one event from a data stream;
access at least one reconciliation data stream that corresponds to the data stream, the at least one reconciliation data stream including at least one reconciliation event that corresponds to the at least one event;
determine, by using at least one model, at least one parameter based on the at least one event and the corresponding at least one reconciliation event, the at least one parameter relating to the data stream;
compare, by using the at least one model, the at least one event with the corresponding at least one reconciliation event to identify at least one data anomaly;
validate, by using the at least one model, the at least one event based on the corresponding at least one reconciliation event;
aggregate information that relates to at least one from among the at least one event, the at least one parameter, the at least one data anomaly, and a result of the validating;
determine, by using the at least one model, at least one potential data error in the data stream based on the identified at least one data anomaly;
generate at least one alert for at least one user, the at least one alert including information that relates to the at least one data anomaly and the at least one potential data error;
retrieve, from at least one repository, contextual data that corresponds to the at least one potential data error, the at least one repository including a data lake;
determine, by using the at least one model and the contextual data, at least one potential impact to the data stream as a result of the at least one potential data error, the at least one potential impact including a severity level; and
append, based on the severity level, the at least one alert to include data that relates to the at least one potential impact.

16. The storage medium of claim 15, wherein, when executed by the processor, the executable code further causes the processor to release the at least one event to at least one downstream consumer based on at least one from among a first result of the determining, a second result of the comparing, and a third result of the validating.

* * * * *